March 30, 1937.  C. H. MARTIN  2,075,584
QUICK CHANGEABLE AUTOMOBILE WHEEL
Filed June 1, 1936   2 Sheets-Sheet 1
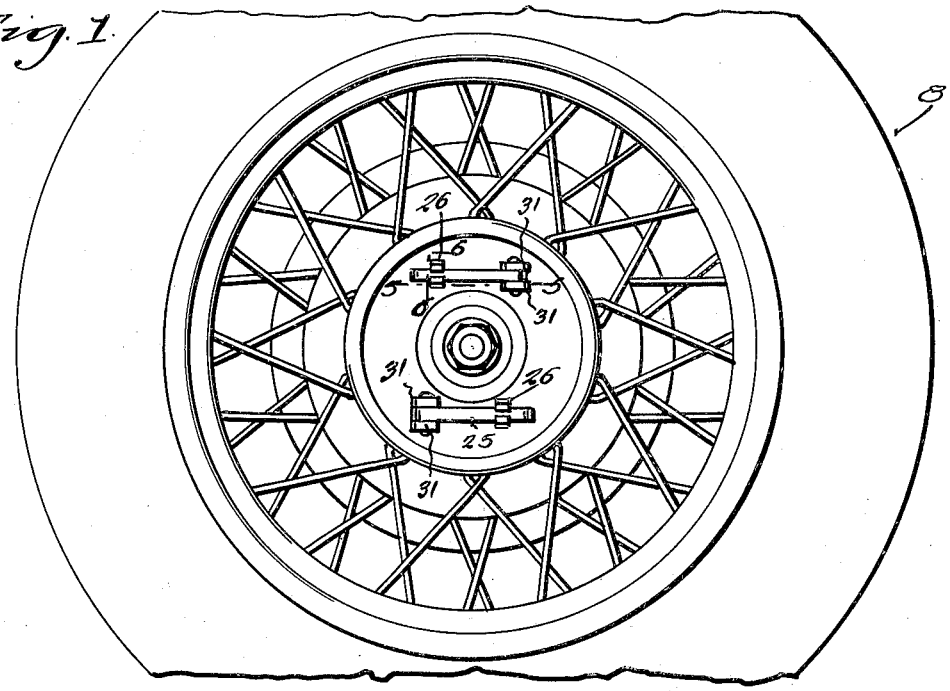
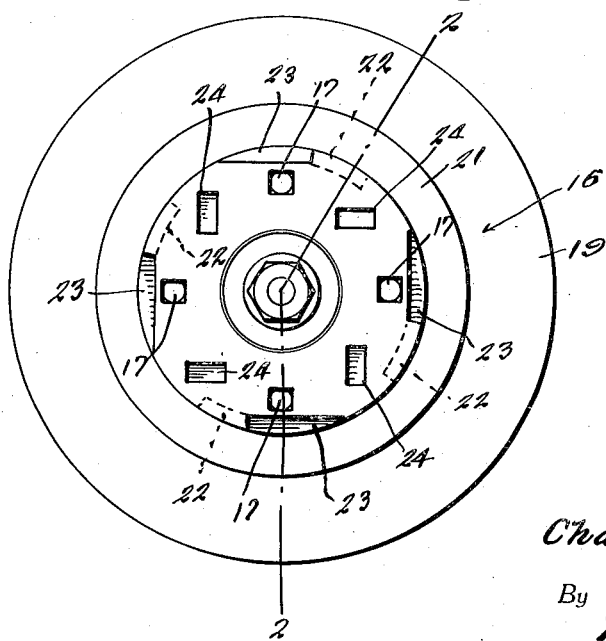
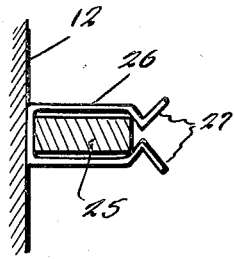
Inventor
Charles H. Martin
By Clarence A. O'Brien
Hyman Berman
Attorneys

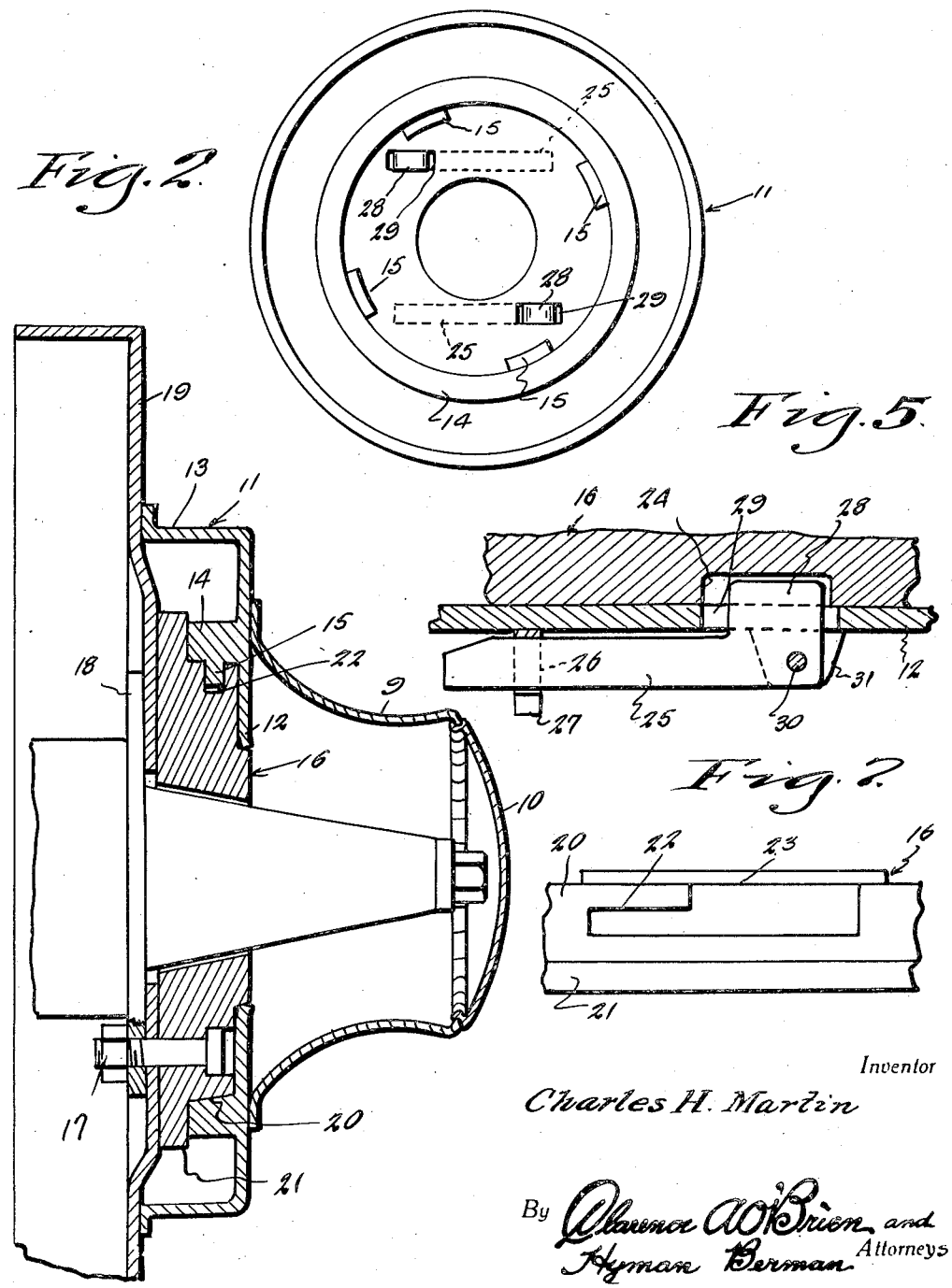

Patented Mar. 30, 1937

2,075,584

UNITED STATES PATENT OFFICE 2,075,584

QUICK CHANGEABLE AUTOMOBILE WHEEL

Charles H. Martin, Argos, Ind.

Application June 1, 1936, Serial No. 82,676

5 Claims. (Cl. 301—9)

This invention relates to dismountable and changeable vehicle wheels, especially of the so-called wire wheel variety including a hub structure having a cap with a removable cover plate designed to permit expeditious access to be had to the hub clamping or fastening means.

Although there are diversified and innumerable wheel and fastening constructions under this general heading, it is to be pointed out, by way of introduction, that the ordinary and generally accepted type now in use involves the utilization of a multiplicity of outstanding threaded studs on the axle flange designed to pass through accommodation holes in the wheel hub and to be rendered effective through the instrumentality of hub clamping nuts.

Like many of my predecessors in this same specialized line of endeavor, I aim to improve upon the aforementioned conventional arrangement by using a structural assembly whose essential novelty is exhibited in a clever and refined structural adaptation possessing unusual simplicity and efficiency and characterized in general by coacting keys and keyways and simple clip retained manually actuated latch devices.

Specifically, therefore, novelty is thought to reside, in one instance, in the provision of a relatively fixed wheel hub mounting characterized by peripherally arranged keyways and keeper means expressly designed to accommodate a surrounding wheel hub mount equipped with lugs or keys for quick separable association with said keyways.

Equally important, and possessed of noteworthy simplicity and efficiency is the coordination with the aforementioned features of simple clip-retained, pivotally mounted L-shaped latches carried by the wheel hub annulus to render the locking keys effective and dependable.

Other features and advantages will become more readily apparent from the following description and drawings.

In the drawings, wherein like numerals are employed to designate like mechanical elements throughout the views:

Figure 1 is what may be designated as a side elevational view of a conventional wire wheel embodying the improved hub construction and attaching means, the cover of the hub cap being removed to expose the readily accessible retention latches.

Figure 2 is a section taken somewhat vertically and centrally through the arrangement depicted in Figure 1, the section being somewhat on the irregular line indicated as 2—2 in Figure 3, being conveniently used for directional purposes.

Figure 3 is an end view showing the fixed wheel hub mounting, that is, the adapter means for the wheel hub structure, the wheel being omitted for clearness of illustration.

Figure 4 is an inside elevational view of the special annular-type wheel hub or so-called mount.

Figure 5 is an enlarged sectional and elevational view showing the latch and keeper arrangement.

Figure 6 is a detail view to show the spring clip used to hold the pivoted latch safely closed.

Figure 7 is a marginal or peripheral edge view detailing one of the key accommodation keyways.

The automobile wheel, which is of the conventional wire type and includes a tire, is denoted generally in Figure 1 by the numeral 8. Among other conventional parts, it includes a suitable sheet metal hub cap 9, as shown in Figure 2, and a removable closing plate 10. The outstanding feature of the wheel is the hub unit 11. This comprises a single annular metal casting, the annulus of which is indicated by the numeral 12 and the rim by the numeral 13. Arranged concentrically within the rim 13 and at right angles to the annulus 12, is the attaching ring or collar 14 and as shown in Figure 4, this is provided with radial equidistant circumferentially spaced keys or lugs 15, of which there are four. It is to be noted that the annulus 12 extends well in in a radial direction beyond the lugs 15 to function as an abutment and to bear against the relatively fixed hub adapter member 16. This casting 16 is secured by bolts or the like 17 to the axle flange 18, the same bolts serving to attach the brake drum 19. The abutment portion of the annulus 12 abuts the outer face of the adapter mounting 16 and the attaching ring 14 surrounds the peripheral surface 20 and strikes against the outstanding abutment flange 21. The periphery 20 is provided with four circumferentially spaced equidistant slots which function as keyways 22 (see Figure 7) to accommodate the keys or lugs 15 which are turnable thereinto. The entrance portions to the keyways are indicated at 23 and open through the outer face of the part 16 to allow the lugs to be inserted and then shoved into the slots and turned into the restricted retention ends thereof in an obvious manner. It is evident, therefore, that the wheel 8 is lifted bodily up and the collar 14 slipped over the periphery 20, the lugs 15 being matched with the entrance openings 23 in the keyways. Then the wheel is bodily turned from left to right and the keys 15 are fed into the retention ends of the keyways or slots. This forms the chief means for detachably joining the hub unit or mounting 11 to the adapter unit 16.

Attention is now called to the pockets 24, shown in Figures 3 and 5, arranged in circumferentially spaced equidistant order and properly located in relation to the keyways to function as keeper pockets. These pockets serve to accommodate the L-shaped retaining latches. Ordinarily two latches will serve, and as each latch construction is the same, a description of one will suffice for both. Referring to Figures 1 and 5, it will be observed that the handle portion of the latch is denoted at 25 and is releasably engageable with a spring clip 26 fastened to the aforementioned annulus 12. Incidentally, the free ends of the clip are flared outwardly, as indicated at 27 to facilitate engagement of the latch handle therewith. They are also shaped to guard against accidental displacement as shown better in Figure 6. The detent portion 28 of the latch is adapted to swing into the keeper pocket 24 through the accommodation aperture or slot 29. The latch is of course suitably and pivotally mounted as at 30 on sustaining lugs 31 carried by the annulus 12.

It is evident that by placing the wheel on the mounting 16 and engaging the lugs in the keyways and bodily turning the wheel, this effects the initial connection. Then the latches are swung down or into place as depicted satisfactorily in Figure 5, and this holds the lugs in the keyways. Together, the companionate and complemental association of parts constitutes a satisfactory quick separable means for use on conventional wire wheels.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. As a component part of a demountable wheel construction of the class described, a hub unit including an annular plate, a marginal rim at right angles thereto, and an annular collar attached to the plate and disposed in concentric spaced relation with respect to the rim, said collar being provided with circumferentially spaced retention lugs, said annulus being further provided with latch accommodation apertures, and pivoted latches mounted on said annulus having detent elements swingable through said apertures.

2. As a component part of a demountable wheel construction of the class described, a hub unit including an annular plate, a marginal rim at right angles thereto, and an annular collar carried by the plate and disposed in concentric radially spaced relation with respect to the rim, said collar being provided with equidistant circumferentially spaced retention lugs, said annulus being further provided with accommodation apertures, pivotally mounted latches on said annulus having detent elements swingable through said apertures, and spring clips fixedly mounted on the annulus to accommodate and safely hold in place the handle portions of the latches.

3. As a component part of a structural assemblage of the class described, in combination, a vehicle axle provided with a hub flange, a brake drum and hub adapter unit fastened to said flange, said unit comprising an annular body portion provided in its periphery with circumferentially spaced grooves constituting keyways and opening through the outer face of the body portion, and said outer face of the body portion being provided, at predetermined points, with depressions constituting keeper seats for cooperable fastening latches.

4. As a new article of manufacture and as a component part of an assemblage of the class described, an annular body adapted to be fixedly mounted on an axle flange, said body having an outstanding circumferential flange and an endless body portion projecting outwardly of the flange, said body portion being provided with L-shaped grooves constituting keyways, said grooves being disposed in circumferentially spaced equidistant order, the outer face of said body portion being provided with depressions in predetermined relationship to said keyways in the manner and for the purposes described.

5. In a structure of the class described, in combination, a vehicle axle including an axle flange, a hub mounting adapter connected with said flange and provided with peripheral keyways, a demountable wheel including a hub unit, said hub unit including a collar surrounding said grooved periphery, said collar having lugs projectable radially inward and adapted for releasable engagement with said keyways, said adapter being provided with keeper pockets, said wheel hub being provided with pivoted latches releasably engageable with said pockets in the manner and for the purposes described.

CHARLES H. MARTIN.